May 12, 1964 G. A. DMITROFF ETAL 3,132,471
POWER AND STARTING SYSTEM FOR ENGINES
Original Filed Jan. 8, 1960 4 Sheets-Sheet 1

INVENTORS
GEORGE A. DMITROFF
EDGAR ROBITAILLE, JR.
BY Jack N McCarthy
AGENT

May 12, 1964 G. A. DMITROFF ETAL 3,132,471
POWER AND STARTING SYSTEM FOR ENGINES
Original Filed Jan. 8, 1960 4 Sheets-Sheet 3

INVENTORS
GEORGE A. DMITROFF
EDGAR ROBITAILLE, JR.
BY Jack N McCarthy
AGENT

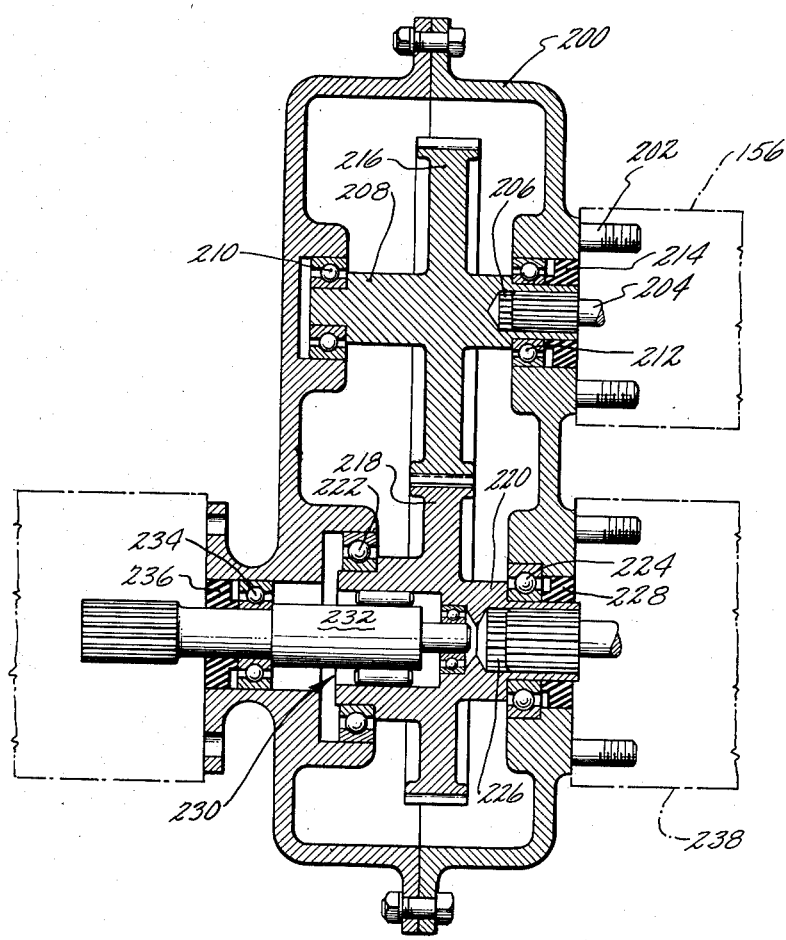

United States Patent Office 3,132,471
Patented May 12, 1964

3,132,471
POWER AND STARTING SYSTEM FOR ENGINES
George A. Dmitroff, Trumbull, and Edgar Robitaille, Jr., Bridgeport, Conn., assignors to United Aircraft Corporation, East Hartford, Conn., a corporation of Delaware
Continuation of application Ser. No. 140,136, Sept. 22, 1961, which is a continuation of application Ser. No. 1,240, Jan. 8, 1960. This application Sept. 21, 1962, Ser. No. 225,431
19 Claims. (Cl. 60—6)

This application is a continuation of copending application Serial No. 140,136, filed September 22, 1961, which is a continuation of application Serial No. 1,240, filed January 8, 1960, both now abandoned, and relates to a hydraulic operating system for engines which provides for starting of the engines and auxiliary power for driving engine accessories and other components.

An object of this invention is to make available electrical and hydraulic power without operating an aircraft propulsion unit.

Another object of this invention is to provide a system which can operate when the aircraft is operating to take over the driving of accessories so that the aircraft propulsion unit has more power available.

A further object of this invention is to provide a system which is operable in low temperature ranges.

A further object of this invention is to provide a starting and power system which provides emergency fluid for actuation of accessories such as landing gear.

Other objects and advantages will be apparent from the specification and claims, and from the accompanying drawings which illustrate an embodiment of the invention.

FIGURE 4 is an enlarged view of the transmission unit connecting the generator and motor pump to the engine or main transmission.

Figure 1:
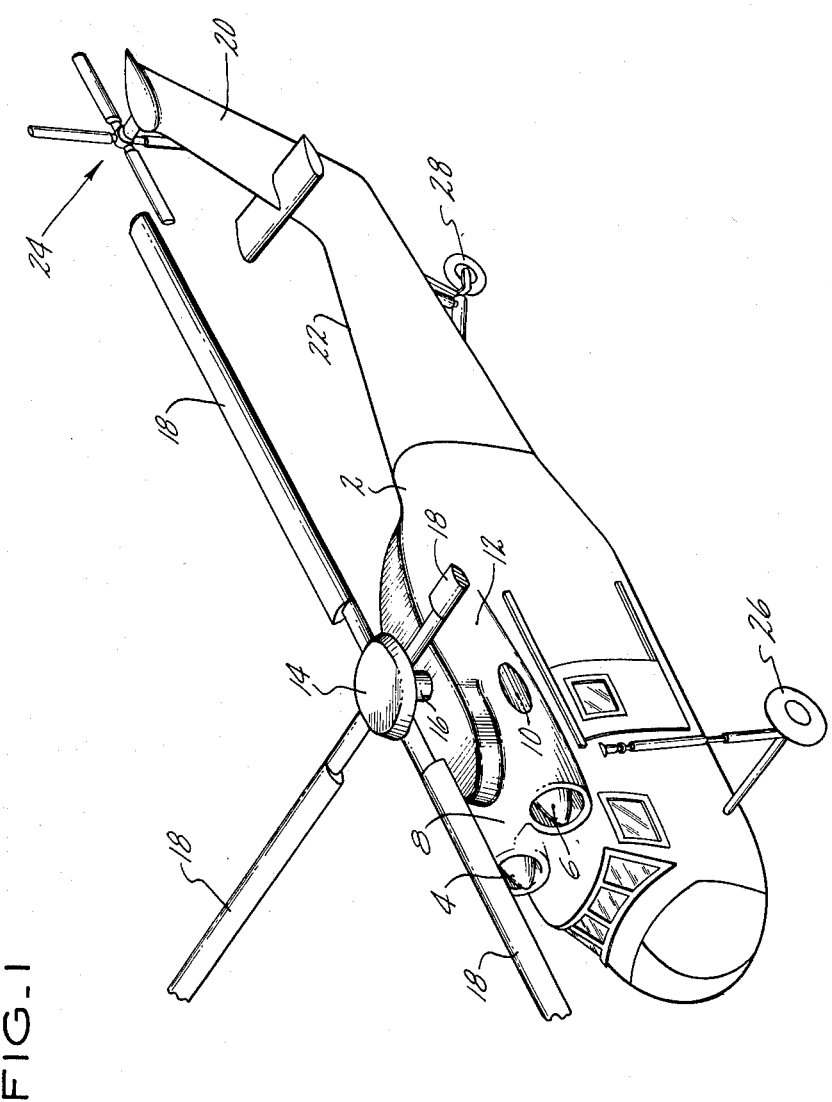
FIGURE 1 is a perspective view of a helicopter having a powerplant with two jet engines for driving its rotor system.

While FIGURE 1 shows a helicopter having a specific configuration, it is to be understood that the power transmission means can be used on any type of helicopter. Further, referring to FIGURE 1, a helicopter is shown having a body 2 which generally houses the pilot and cargo or passenger compartments. The powerplant is shown located on top of the helicopter comprising two gas turbine engines 4 and 6 which are mounted in a housing 8 in a side-by-side relationship. Their exhaust is directed from the side of the housing through openings 10. A main rotor pylon 12 covers the power transmission system and extends between the housing 8 and the body 2 of the helicopter. The main rotor head 14 is supported on the upper end of an upright drive shaft 16 which extends upwardly from the power transmission system. This system is connected between said drive shaft and two gas turbine engines 4 and 6. A power transmission system which can be used in a helicopter of this type is shown and claimed in U.S. Application Serial No. 757,881, filed August 28, 1958, now patent No. 2,979,968 for a Power Transmission System by Frederick C. Beurer. Rotor blades 18 are mounted on the rotor head in a usual manner. The helicopter may be controlled by any control mechanism desired; such a control mechanism is shown in the patent to Alex, U.S. Patent No. 2,811,324. A rear pylon 20 extends upwardly from the tail cone 22. A tail rotor 24 is mounted on said pylon. Conventional forward landing gear 26 and rear landing gear 28 are shown thereon.

Figure 2:
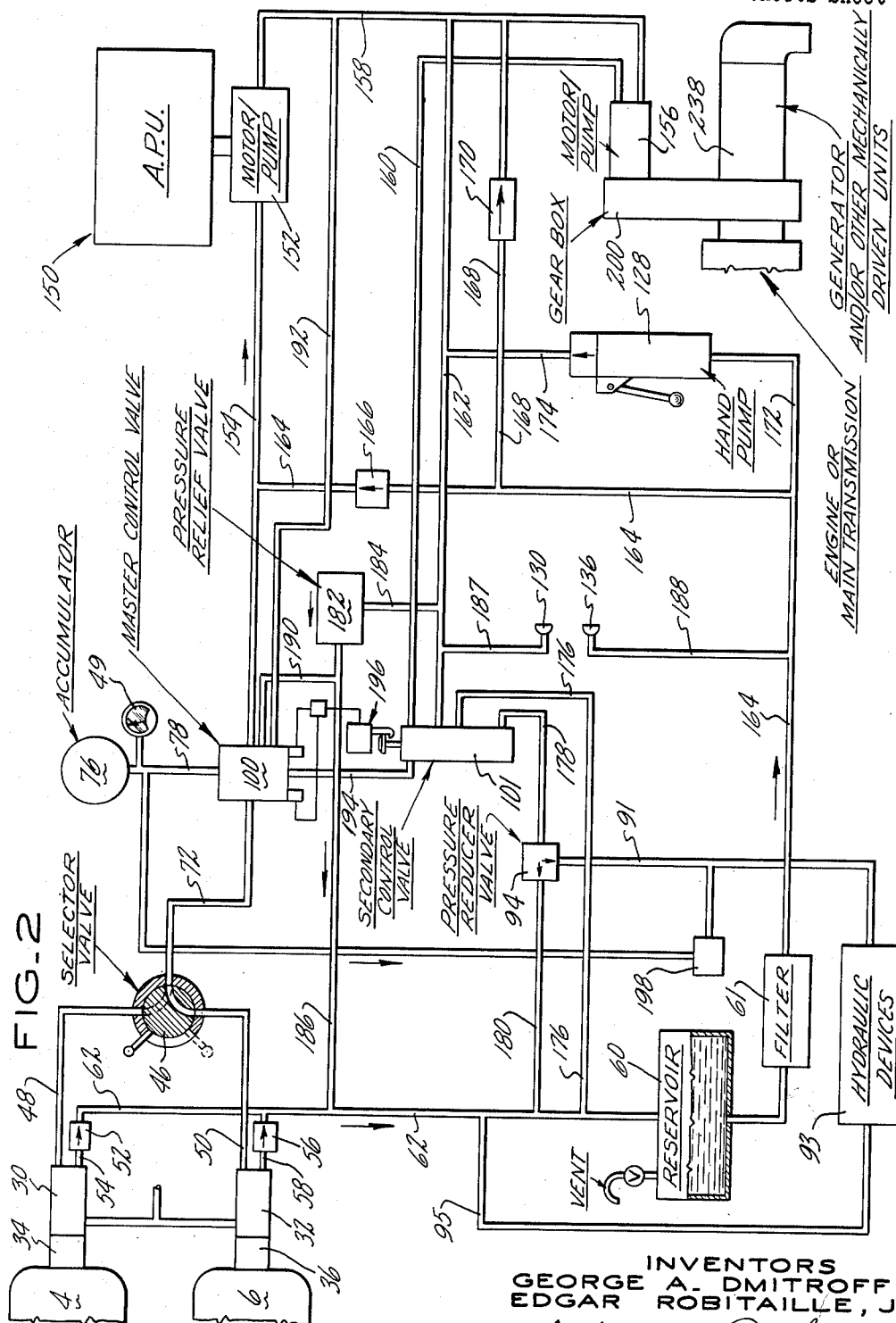
FIGURE 2 is a schematic view of the starting and power system.

FIGURE 2 shows two hydraulic starter motors 30 and 32 connected through overrunning clutches 34 and 36, respectively, to cooperating starters on engines 4 and 6. These clutches are provided to disengage the hydraulic motors from the engines at a predetermined speed. The inlet to the hydraulic starter motor 30 is attached to one outlet of a two-way selector valve 46 by conduit 48. The inlet of the hydraulic starter motor 32 is connected to the other outlet of the two-way selector valve 46 by conduit 50. The outlet of the hydraulic starter motor 30 is connected to the inlet of a check valve 52 by conduit 54 and the outlet of the hydraulic starter motor 32 is connected to the inlet of a check valve 56 by conduit 58. Each outlet of the check valves 52 and 56 is connected to a reservoir 60 by conduit 62. Reservoir 60 may be vented to atmosphere or pressurized, depending on the type of system used.

An accumulator 76 is connected to the selector valve 46 by a conduit 78, a master control valve 100 and a conduit 72. A secondary control valve 101 is connected to the master control valve 100 in a manner to be hereinafter described.

An auxiliary power unit 150 has a motor/pump unit 152 which is connected to the master control valve by conduit 154. Motor/pump 152 is connected to a second motor/pump unit 156 by conduit 158. Motor/pump 156 is connected to the secondary control valve 101 by conduit 160. This motor/pump 156 is drivingly connected to either the main transmission accessories or the engine accessories in a manner to be hereinafter described. Conduit 158 is also connected to the secondary control valve 101 by conduit 162.

Reservoir 60 has an outlet connected to conduit 154 by conduit 164. This conduit 164 has a filter 61 and a check valve 166 located therein. The check valve 166 permits flow only from reservoir 60 to conduit 154. A conduit 168 connects conduit 164 at a point between reservoir 60 and the inlet to check valve 166 to conduit 158. A conduit 188 connects conduit 164 and quick disconnect 136. Conduit 168 has a check valve 170 located therein which permits flow only from conduit 164 to conduit 158. A hand pump 128 has its inlet connected to conduit 164 by conduit 172 and has its outlet connected to conduit 162 by a conduit 174.

Secondary control valve 101 is connected to conduit 62 by a conduit 176. This secondary control valve 101 is also connected to a pressure reducer valve 94 by conduit 178. The outlet of the pressure reducer valve, giving the desired reduced pressure, is connected to a utility system by a conduit 91 which, in a helicopter, operates such devices 93 as taxi gear motors, cargo hoisting mechanisms, blade folding means, landing gear actuators, and nose door actuators. This pressure reducer valve is also connected to conduit 62 by a conduit 180 which permits any excess to be returned to the reservoir 60. A pressure reducer valve is unnecessary if the output pressure from the secondary control valve through conduit 178 is satisfactory for operation of the hydraulic devices of the utility system. The outlets of the utility devices are connected to conduit 62 by a conduit 95.

A pressure relief valve 182 has its inlet connected to conduit 162 by a conduit 184 and has its outlet connected to conduit 62 by a conduit 186.

A provision for external operation of this system is the location of hydraulic inlet and outlet connectors in the system so that an external hydraulic pump can be connected thereto. An inlet connector 130 is shown connected to conduit 162 by conduit 187 and an outlet connector 136 is shown connected to conduit 164 by conduit 188. These connectors can be of the quick connect-disconnect type to provide for speed and ease of connection.

Master control valve 100 is connected to conduit 186 by conduit 190. This master control valve is also connected to conduit 158 by conduit 192.

The master control valve 100 and the secondary control valve 101 are interconnected by a conduit 194 and an electrical mechanical device 196. The interconnection of these two valves, 100 and 101, is clearly shown in FIGURE 3. An emergency bypass valve 198 is connected between conduit 78 and conduit 91.

Motor/pump 156 is fixed to transmission unit 200 by means of bolts 202. The splined operating shaft 204 of the motor/pump 156 is positioned in an internally splined receptacle 206 located in the end of a shaft 208. Shaft 208 is mounted for rotation in the transmission unit 200 by bearing units 210 and 212 on opposite sides of the unit. The end of the shaft 208 having the splined receptacle is open to the exterior of the transmission unit and has a sealing member 214 positioned between the free end of the shaft and the transmission unit. A gear 216 is formed integrally with the shaft 208. While the gear is shown integrally formed with the shaft, the two may be fixedly connected by any means desired. Gear 216 meshes with a second gear 218 which is also mounted for rotation in the transmission unit 200.

Gear 218 is integrally formed with a shaft 220 which is mounted in bearing units 222 and 224. The end of the shaft 220 extending away from engine 6 is formed having an internally splined receptacle 226. A sealing member 228 is positioned between the free end of the shaft 220 and transmission unit 200. The other end of shaft 220 is formed as a one-way drive mechanism 230. This mechanism is formed having a shaft 232 extending therefrom which is mounted for rotation in the transmission unit 200. Bearing unit 234 and a sealing member 236 are provided between this shaft 232 and the transmission unit. The shaft 232 has a splined end which extends into engine 6 and is drivingly connected to the drive shaft of the engine.

As shown in FIGURE 2, a generator 238 is shown fixed to the transmission unit 200. While only a generator has been shown, other gears can be mounted in the transmission unit 200 to mesh with gears 216 or 218 to drive other units.

The one-way drive mechanism 230 is so arranged that when motor/pump 156 is being driven as a motor, the shaft 204 in turn drives the gear 218, and any other gear which may be connected thereto, in order to drive the generator and any other mechanically driven unit which may be connected to any additional gears. This driving movement by motor/pump 156 will not drive shaft 232. However, when the engine has been started and is running, it will drive shaft 232 to in turn drive the generator 238 and any other mechanically driven unit connected to the gear 218 and will drive the motor/pump 156 so that it will act as a pump.

The master control valve 100 includes a housing 250 having two valves 252 and 254 located therein. Valve 252 comprises a cylindrical bore 256 in housing 250 with a piston member 258 slidably mounted therein. Piston member 258 is formed having two lands 260 and 262. Land 260 cooperates with the end of conduit 72 which extends through housing 250. Both of the lands 260 and 262 serve to guide the piston member within the cylindrical bore 256. Valve 252 has a stem 264 which extends externally of said housing. The valve 252 is biased to a closed position by a spring 266 which acts between the housing 250 and a flange 268 on stem 264. The external portion of stem 264 forms part of a solenoid 270 which moves valve 252 to its open position when energized. This solenoid 270 is energized in a manner to be hereinafter described.

Valve 254 comprises a cylindrical bore 272 in housing 250 with a piston member 274 slidably mounted therein. Piston member 258 is formed having two lands 276 and 278. Land 276 cooperates with the end of conduit 154 which extends through housing 250 and land 278 cooperates with the end of conduit 192 which extends through housing 250. The end of conduit 190 which extends through housing 250 opens into the cylindrical bore 272 between the ends of conduits 154 and 192. Both of these lands serve to guide the piston member within bore 272. Valve 254 has a stem 280 which extends externally of said housing. The valve 254 is biased to a closed position by a spring 282 which acts between the housing 250 and a flange 284 on stem 280. The external portion of stem 280 forms part of a solenoid 286 which moves valve 252 to its open or downward position when energized. This solenoid 286 is energized in a manner to be hereinafter described.

Each of the cylindrical bores 256 and 272 are connected by a passageway 288 at a point below lands 262 and 278, respectively, when the valves are biased to their upward position. Passageway 288 is connected to the end of conduit 194 which extends into housing 250 by a check valve 290 which permits flow only from conduit 194 into passageway 288. Passageway 288 is connected with the end of conduit 78 which extends into housing 250 by a passageway 292. Passageway 292 is connected to the top of each cylindrical bore 256 and 272 by passageways 294 and 296, respectively. A double-pole double-throw switch 298 is provided which energizes in one position a solenoid 270 and in its other position energizes the solenoid 286, and in both positions a solenoid 299 is operated for a purpose which is to be hereinafter described.

The electrical mechanical device 196 includes a double-pole double-throw switch 298. This switch is connected at each of its poles 340 and 342 to one terminal of a power source 344. This power source 344 has another connection to ground. When the switch 298 is placed in its "Eng." position, the poles 340 and 342 are connected respectively to terminals 346 and 348. Terminal 348 is connected by an electrical line 350 to the coil of the solenoid 270. The coil has another connection to ground. Terminal 346 is connected by an electrical line 352 to the coil of the solenoid 299. The coil of this solenoid 299 is also connected to ground. When the switch 298 is placed in its "A.P.U." position, the poles 340 and 342 are connected respectively to terminals 354 and 356. Terminal 356 is connected by an electrical line 358 to the coil of the solenoid 286. This coil has another connection to ground. Terminal 354 is connected to the electrical line 352.

The secondary control valve 101 includes a housing 300 having a cylindrical bore located in each end thereof having coinciding longitudinal axes. Cylindrical bore 302 forms part of a blocking valve and bore 304 forms part of a relief valve. A piston member 306 is mounted in cylindrical bore 302 for movement therein and a piston 308 is positioned in bore 304 for movement therein. Pistons 306 and 308 are interconnected by shaft 310 which passes through an opening 312 in the center of housing 300. A spring 314 is located in bore 302 around shaft 310 between the upper end of the bore 302 and the upper face of piston 306. This biases the pistons 306 and 308 downwardly. Piston 308 is formed having two lands 322 and 324.

A rod 316 extends from the upper face of piston 308 through the upper end of bore 304 and housing 300 to the exterior thereof. An annular holding member 318 is positioned on the free end of rod 316 for a purpose to be hereinafter described. The upper face of holding member 318 is rounded or beveled such as at 320.

The electrical mechanical device 196 includes a mechanical latching mechanism with a latch 390 having a hook 392 with a rounded end 394. The latch is mounted on a fixed pivot at 396. This pivot 396 is located on bracket 398 which is in turn fixed to aircraft structure. The latch 390 is positioned in line with annular holding member 318 so that the rounded or beveled face 320 of the member will engage the rounded end 394 of the latch to cam the latch to the right and place the annular holding member 318 over the hook 392 when the piston 308 is moved to its full upward position.

The free end of the latch 390 which extends upwardly from the pivot 396 is connected to the moving core of the solenoid 299 by a rod 400. A spring 402 is located around the rod 400 between a fixed collar 404 on said rod and the housing 406 of the solenoid 299 which is fixed to aircraft structure. This spring biases the latch 390 to its position shown in FIGURE 3. A stop 408 is fixed to aircraft structure and provides a positioning means against which spring 402 biases the free end of latch 390.

The end of conduit 194 which extends into housing 300 is connected by a passageway 326 to the cylindrical bore 304 at a point just above land 322 in its upward position. Conduit 160 extends into housing 300 and engages the surface of bore 304 at a point adjacent the annular space between lands 322 and 324 when the piston 308 is located in its upward position. Conduit 162 extends into housing 300 and engages the surface of bore 304 at a point adjacent land 322 when piston 308 is located in its upward position. Passageway 326 is connected to the lower face of cylindrical bore 304 by passageway 328.

Passageway 328 is connected into bore 302 at a point adjacent the cylindrical side surface of the piston 306 when it is in its spring biased position downwardly. When piston 308 is in its downward position, the end of conduit 194 is open into the annular space between lands 322 and 324. Conduit 160 engages the surface of bore 304 at a point adjacent land 324 when piston 308 is located in its downward position and conduit 162 engages the surface of bore 304 at a point adjacent the annular space between lands 322 and 324 when the piston 308 is located in its downward position.

A third bore 370 is located in the housing 300 having a longitudinal axis parallel to the axis of bores 302 and 304. A piston member 372 is located in said bore 370 having two pistons 374 and 376 interconnected by a rod 378. The rod 378 is of such length as to provide a valve action to be hereinafter described. Means are provided in bore 370 for sealing the piston rod 378 so that there is no fluid leakage between the two sections of the bore 370. A sealing ring 380 has been shown located in an annular projection 382. A spring 282 is located around the piston rod 378 between the upper face of the piston 376 and the lower face of the annular projection 382. This action biases piston member 372 to its downward position.

A passageway 384 connects the bore 302 adjacent its midpoint to bore 370 at a point covered by the side of piston 376 when it is in its bottom spring biased position. When piston 306 is in its upward position and hooked position, passageway 328 is connected to passageway 384. Conduit 178 enters housing 300 and is connected to bore 370 at a point covered by the side of piston 376 when it is in its spring biased position. When the piston 376 is in its upward position in bore 370, passageway 384 is connected to conduit 178.

A passageway 386 connects the bore 304 to bore 370. This passageway 386 enters bore 304 at a point which is covered by land 322 when piston 308 is located in its downward position. When piston 308 is in its upward position, the passageway 386 is open to the bore 304; as piston 308 moves downwardly and the holding member 318 is caught by hook 392, the land 322 covers passageway 386. Conduit 176 enters housing 300 and is connected to bore 370 at a point covered by the side of piston 374 when it is in its spring biased position. Passageway 386 opens into bore 370 at a point just below piston 374 when the piston is in its spring biased position downwardly. When piston 376 is in its upward position, passageway 386 is connected to conduit 176.

*Operation*

In this system, the accumulator may be charged by the hand pump 128, motor/pump 152, motor/pump 156, or by an external pump unit attached to connectors 130 and 136. If this system is just being placed in operation, or the accumulator is not charged for some other reason, the hand pump 128 may be operated to charge said accumulator. First, the movable pistons 306 and 308 of the secondary control valve 101 are located in their down position, if they are not already in that position; and, second, the switch 298 is located in its normally open position. Hand pump 128 then pumps fluid through conduit 172 and conduit 164 from reservoir 60 through conduit 174 to conduit 162. Fluid in conduit 162 can pass only to the secondary control valve 101 since it is blocked from flowing in any other direction. This fluid then passes around the annular groove in piston 308 to passageway 326. From this point, the fluid passes through conduit 194, check valve 290, passageway 292 and conduit 78 to the accumulator 76. As the pressure built up by the hand pump 128 reaches the pressure at which piston members 308 and 306 start to rise, this pressure being determined by the force of spring 314, the charge in the accumulator is sufficient for its operation. This can be indicated to the pilot by a gauge 49 or some other indicating means.

Another way to charge the accumulator is by the use of an external pump connected to the inlet and outlet connectors 130 and 136, respectively. Here again, pistons 306 and 308 are located in their downward position and switch 298 is located in its normally open position. In this arrangement, the outlet of the external pump will discharge into connector 130 and through conduits 187 and 162 into the annular space around piston 308. From this point, the fluid passes to the accumulator 76 in the same manner as it does with the hand pump 128. Connector 136 is connected to conduit 164 by conduit 188 which provides a fluid supply. This external pump can also remain in operation to actuate the engine accessories and the hydraulic devices. This pump can also start the A.P.U. if it has a high enough capacity.

In starting the auxiliary power unit (A.P.U.) the pilot will place switch 298 in its "A.P.U." position. This closing of switch 298 energizes solenoids 286 and 299. The energizing of solenoid 286 will move valve 254 to its downward position so that conduit 78 is connected to conduit 154 and conduit 192 is connected to conduit 190. This permits the accumulator 76 to be connected to the motor/pump 152.

The path of flow from the accumulator will be through conduit 78, passageway 296, valve 254, conduit 154, motor/pump 152 acting as a motor, conduit 192, annular groove of valve 254, conduit 190, conduit 186 and conduit 62 to the reservoir 60. Immediately after the auxiliary power is started, it is allowed to warm up with the switch in its "A.P.U." position. The fluid being pumped will follow a path of least resistance. The energizing of solenoid 299 will move latch 390 to a position so that the hook 392 will not be in the path of holding member 318. If the holding member is held by the hook, it will be released so that pistons 306 and 308 may be biased to their downward position. This will occur if the pressure below piston 308 drops in value. It is necessary that piston 308 be in its downward position for subsequent recharging of the accumulator in preparation for the next use thereof.

Figure 3:
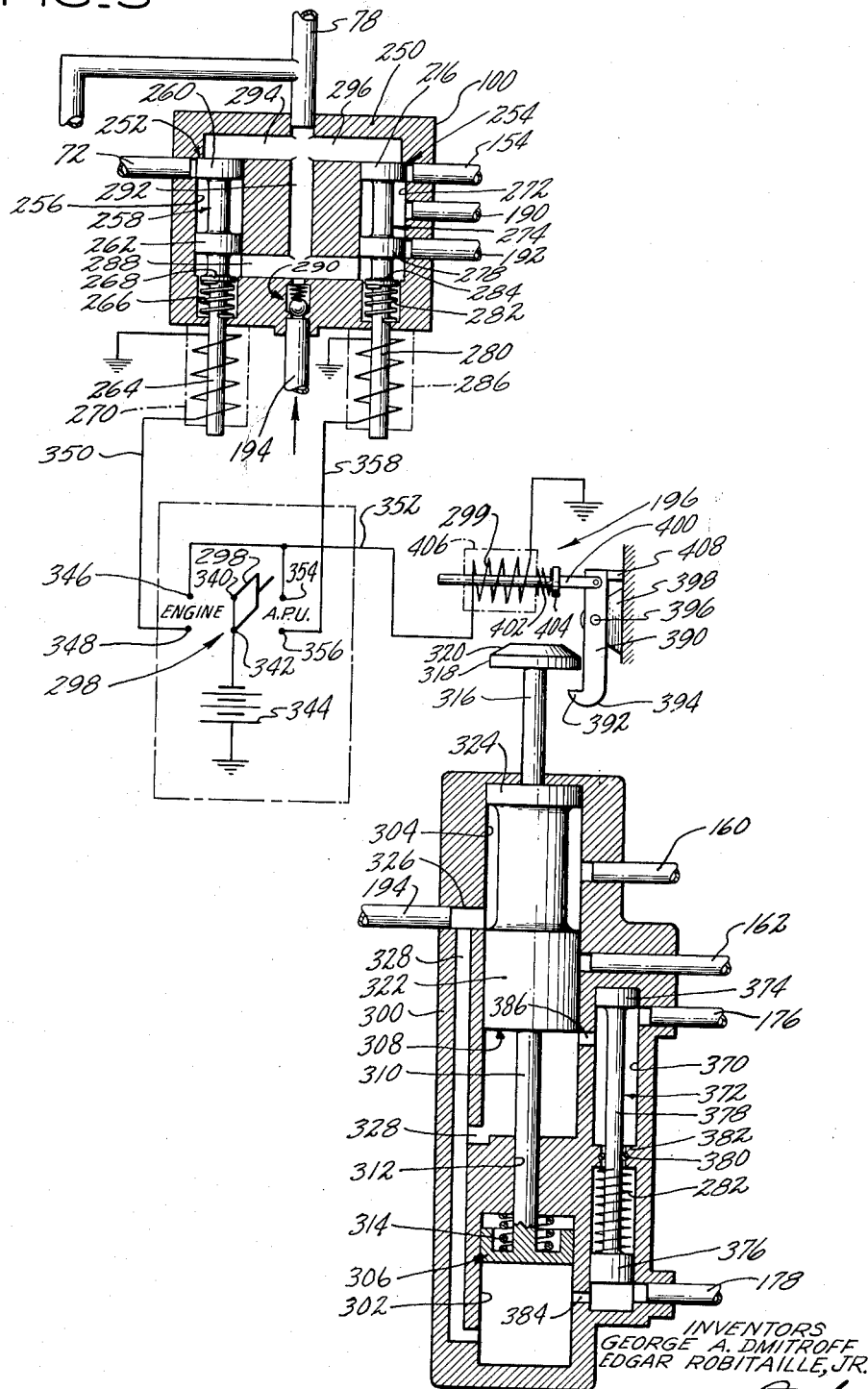
FIGURE 3 is an enlarged view of the master control valve and secondary control valve.

When the switch 298 is returned to an open position after A.P.U. warm-up, as shown in FIGURE 3, valve 254 is returned to its upward position by spring 282 and latch 390 will be moved to its holding position by spring 402 since the solenoids 286 and 299 will be de-energized.

With the de-energization of solenoid 286 and therefore the movement of valve 254 to its upward position, the flow from conduit 78 to conduit 154 and the flow from conduit 192 to conduit 190 is shut off. The path of fluid through motor/pump 152 acting as a pump is now through conduit 158, conduit 162, the annular groove around piston 308 to passageway 326. The fluid then passes to the accumulator by the same path as set forth above. When the accumulator charge reaches a predetermined value, the pressure of the fluid in passageway 328 acts on the bottom of piston 308 to move the pistons 306 and 308 and holding member 318 to its upward position. It can be seen from this action that the accumulator has been recharged and that the path of flow from motor/pump 152 is now through conduit 158, motor/pump 156 acting as a motor, conduit 160, the annular groove around piston 308, passageway 326, and passageway 328 to conduit 178. Motor/pump 156 will be acting to drive the generator and any other mechanically driven units connected thereto. The flow then passes through a pressure reducer valve 94 which sends the fluid at the proper pressure through conduit 91 to the hydraulic devices 93. Excess pressure is passed through pressure reducer valve 94 to conduit 180 to conduit 62 where it is directed to the reservoir 60. The outlet of the hydraulic devices 93 is connected to conduit 62 by conduit 94. This shows how the A.P.U. 150 can drive the engine accessories and the aircraft hydraulic devices without using the aircraft power plant propulsion unit.

In starting the engines on the helicopter shown in FIGURE 1, the pilot will position the selector valve 46 to select whichever engine he desires to start first. Assuming he desires to start engine 6 first, the selector valve 46 will be placed in the position shown in full lines in FIGURE 2. Switch 298 will then be placed in its "Eng." position. This closing of switch 298 energizes solenoids 270 and 299. The energizing of solenoid 270 will open valve 252 so that passageway 294 is connected to conduit 72. This permits the accumulator 76 to be connected to the starter motor 32, along with the output of the motor/pump 152. If the accumulator is charged, it will discharge to the starter 32.

The path of flow from the accumulator will be through conduit 78, passageway 294, valve 252, conduit 72, valve 46 and conduit 50. The energizing of solenoid 299 will move latch 390 to a position so that the hook 392 will not be in the path of holding member 318. If the holding member is held by the hook, it will thereby be released so that pistons 306 and 308 may be biased to their downward position if the pressure below piston 308 drops. It is necessary that piston 308 be in its downward position to insure the flow from the motor/pump 152 as described above through conduit 162. Further, it is necessary that this valve be in this position for subsequent recharging of the accumulator in preparation for the next use thereof.

When the next engine, engine 4, is to be started, the selector valve is placed in the position shown in dotted lines in FIGURE 2. The operation described above for the starting of engine 6 holds for engine 4.

When the engines are running and the A.P.U 150 is off, the motor/pump 156 acts as a pump and drives the hydraulic devices 93 through conduit 160, secondary valve 101 and therethrough conduit 178, pressure reducer valve 94 and conduit 91. During this operation, the generator and other connected mechanically driven units will be driven by the engines. If at least one engine is running and it is necessary to charge the accumulator, this can be done through the motor/pump 156. The gear box 200 can be connected to an engine or the main transmission of an aircraft. It is advisable that the gear box be driven through both engines such as through the main transmission as a safety measure.

When either or both of the engines are running, the A.P.U. can be started to drive the generator and other mechanically driven units along with the hydraulic devices, thus unloading the engine or engines.

It is to be understood that the invention is not limited to the specific description above or to the specific figures, but may be used in other ways without departure from its spirit as defined by the following claims.

We claim:
1. In combination, a main engine, a hydraulic starting motor drivingly connected to said main engine, an auxiliary engine, a first hydraulic motor/pump drivingly connected to said auxiliary engine, an accumulator, first valved means connecting said accumulator to said first hydraulic motor/pump to drive said motor/pump as a motor to start said auxiliary engine, second valved means connecting said accumulator to said hydraulic motor to drive said motor to start said main engine, a transmission unit, an engine accessory drivingly connected to said transmission unit, first means connecting said main engine to said transmission unit for driving it, a second hydraulic motor/pump, second means connecting said second hydraulic motor/pump to said transmission unit for power transmission therebetween, and third means connecting said first hydraulic motor/pump to said second hydraulic motor/pump for operating said second motor/pump as a motor when said first hydraulic motor/pump is operating as a pump to drive said transmission unit and therefore said accessory.

2. In combination, a main engine, a hydraulic starting motor drivingly connected to said main engine, an auxiliary engine, a first hydraulic motor/pump drivingly connected to acid auxiliary engine, an accumulator, first valved means connecting said accumulator to said first hydraulic motor/pump to drive said motor/pump as a motor to start said auxiliary engine, second valved means connecting said accumulator to said hydraulic motor to drive said motor to start said main engine, a transmission unit, an engine accessory drivingly connected to said transmission unit, first means connecting said main engine to said transmission unit for driving it, a second hydraulic motor/pump, second means connecting said second hydraulic motor/pump to said transmission unit for power transmission therebetween, third means connecting said first hydraulic motor/pump to said second hydraulic motor/pump for operating said second motor/pump as a motor when said first hydraulic motor/pump is operating as a pump to drive said transmission unit, a hydraulically operated device, and fourth means connecting said second hydraulic motor/pump to said hydraulically operated device for operating said device when said second hydraulic motor/pump is operating as a pump.

3. In combination, a main engine, a hydraulic starting motor drivingly connected to said main engine, an auxiliary engine, a first hydraulic motor/pump drivingly connected to said auxiliary engine, an accumulator, first valved means connecting said accumulator to said first hydraulic motor/pump to drive said motor/pump as a motor to start said auxiliary engine, second valved means connecting said accumulator to said hydraulic motor to drive said motor to start said main engine, a transmission unit, an engine accessory drivingly connected to said transmission unit, first means connecting said main engine to said transmission unit for driving it, a second hydraulic motor/pump, second means connecting said second hydraulic motor/pump to said tranmsission unit for power transmission therebetween, third means connecting said first hydraulic motor/pump to said second hydraulic motor/pump for operating said second motor/pump as a motor when said first hydraulic motor/pump is operating as a pump to drive said transmission unit, a hydraulically operated device, fourth means connecting said second hydraulic motor/pump to said hydraulically operated device for operating said device when said second hydraulic motor/pump is operating as a pump, and fifth means connecting said first hydraulic motor/pump to said hydraulically operated device for operating said device when said first hydraulic motor/pump is operating as a pump.

4. In combination, a main engine, a hydraulic starting motor drivingly connected to said main engine, an auxiliary engine, a first hydraulic motor/pump drivingly connected to said auxiliary engine, an accumulator, first valved means connecting said accumulator to said first hydraulic motor/pump to drive said motor/pump as a motor to start said auxiliary engine, second valved means connecting said accumulator to said hydraulic motor to drive said motor to start said main engine, a transmission unit, an engine accessory drivingly connected to said transmission unit, first means connecting said main engine to said transmission unit for driving it, a second hydraulic motor/pump, second means connecting said second hydraulic motor/pump to said transmission unit for power transmission therebetween, third means connecting said first hydraulic motor/pump to said second hydraulic motor/pump for operating said second motor/pump as a motor when said first hydraulic motor/pump is operating as a pump to drive said transmission unit, a hydraulically operated device, fourth means connecting said second hydraulic motor/pump to said hydraulically operated device for operating said device when said second hydraulic motor/pump is operating as a pump, fifth means connecting said first hydraulic motor/pump to said hydraulically operated device for operating said device when said first hydraulic motor/pump is operating as a pump, and third valved means connecting said accumulator to said hydraulically operated device to operate said device.

5. In combination, a main engine, a hydraulic starting motor drivingly connected to said main engine, an auxiliary engine, a first hydraulic motor/pump drivingly connected to said auxiliary engine, an accumulator, first valved means connecting said accumulator to said first hydraulic motor/pump to drive said motor/pump as a motor to start said auxiliary engine, second valved means connecting said accumulator to said hydraulic motor to drive said motor to start said main engine, a transmission unit, an engine accessory drivingly connected to said transmission unit, first means connecting said main engine to said transmission unit for driving it, a second hydraulic motor/pump, second means connecting said second hydraulic motor/pump to said transmission unit for power transmission therebetween, third means connecting said first hydraulic motor/pump to said second hydraulic motor/pump for operating said second motor/pump as a motor when said first hydraulic motor/pump is operating as a pump to drive said transmission unit, and third valved means in one position connecting said first hydraulic motor/pump to said accumulator when said second hydraulic motor/pump is operating as a pump to charge said accumulator, a hydraulically operated device, said third valved means in another position connecting said second hydraulic motor/pump to said hydraulically operated device to operate said device when said second hydraulic motor/pump is operating as a pump.

6. In combination, an engine, a hydraulic motor operatively connected to said engine, an auxiliary engine, a first motor/pump operatively connected to said auxiliary engine, a first conduit means between said hydraulic motor and said motor/pump, valve means in said first conduit means, a source of fluid under pressure operatively connected to said valve means, an engine accessory operatively connected to said engine, a second motor/pump operatively connected to said engine accessory, and second conduit means between said first and second motor/pumps, said valve having means to direct fluid under pressure from said source to drive said first motor/pump to start said auxiliary engine and drive said second motor/pump by the fluid discharged from said first motor/pump, said valve also having means to direct fluid from said first motor/pump to said hydraulic motor when said auxiliary engine has started to start said main engine whereby said engine will drive said second motor/pump means as a pump.

7. In combination, an engine, a hydraulic motor operatively connected to said engine for starting it, an auxiliary engine, a motor/pump operatively connected to said auxiliary engine for starting it and being driven thereby, drive means connected between said hydraulic motor and said motor/pump, said drive means having a fluid outlet connected to said hydraulic motor, an engine accessory operatively connected to said engine to be driven thereby, motor means operatively connected to said engine accessory to drive said accessory, conduit means between said motor/pump and said motor means for driving said motor means when said motor/pump is operating as a pump, an accumulator, valved means to direct fluid under pressure from said accumulator to drive said motor/pump to start said auxiliary engine, said motor/pump drives said motor means by the fluid discharged therefrom to drive said accessory, said drive means having valved means to direct fluid to said outlet for said hydraulic motor when said auxiliary engine has started to start said main engine whereby said engine will drive said accessory.

8. In combination, first power plan means for providing a main source of power, said first means including a main engine, an auxiliary engine, second means connected to said auxiliary engine for starting said auxiliary engine, an engine accessory, third means operably connecting said main engine and said engine accessory for driving said accessory, fourth means operably connecting said auxiliary engine and said main engine for starting said main engine, fifth means operably connecting said auxiliary engine and said engine accessory for driving said accessory, a hydraulically operated device, sixth means operably connecting said main engine and said hydraulically operated device for driving said device, and seventh means operably connecting said auxiliary engine and said hydraulically operated device for driving said device.

9. In combination, first power plant means for providing a main source of power, said first means including a main engine, an auxiliary engine, second means connected to said auxiliary engine for starting said auxiliary engine, third means operably connecting said auxiliary engine and said main engine for starting said main engine, an engine accessory, fourth means operably connecting said main engine and said engine accessory for driving said accessory, a hydraulically operated device, fifth means operably connecting said main engine and said hydraulically operated device for operating said device, and sixth means operably connecting said auxiliary engine with said engine accessory and said hydraulically operated device for operating said accessory and device.

10. In combination; first power plant means for providing a main source of power; said first means including a main engine; an auxiliary engine; second means for starting said auxiliary engine; third means for starting said main engine; an engine accessory, fourth means operably connecting said main engine and said engine accessory for driving said accessory; fifth means operably connecting said second means for starting said auxiliary engine and said engine accessory for driving said accessory; an accumulator; and valved means for directing fluid from said accumulator to said second means for starting said auxiliary engine.

11. In combination; first power plant means for providing a main source of power; said first means including a main engine; an auxiliary engine; second means for starting said auxiliary engine; an engine accessory; third means for starting said main engine driven by said auxiliary engine; fourth means operably connecting said main engine and said engine accessory for driving said accessory; said second means including a hydraulic motor/pump connected to said auxiliary engine, an accumulator, and valved means for connecting said accumulator to said hydraulic motor/pump to drive said motor/pump as a motor; said third means including said hydraulic motor/pump, a hydraulic motor connected to said main engine to start it, and valved means for connecting said motor/ pump to said hydraulic motor to drive said hydraulic motor when said motor/pump is operating as a pump; and fourth means operably connecting said motor/pump with said engine accessory for driving said accessory when said motor/pump is operating a pump.

12. In combination; first power plant means for providing a main source of power; said first means including a main engine; an auxiliary engine; an engine accessory; third means for starting said auxiliary engine, fourth means operably connecting said main engine and said engine accessory for driving said accessory by said main engine; said second means including a hydraulic motor/pump connected to said auxiliary engine, an accumulator, and valved means for connecting said accumulator to said hydraulic motor/pump to drive it as a motor to start said auxiliary engine; fifth means operably connecting said motor/pump with said engine accessory for driving said accessory by said auxiliary engine; a hydraulically operated device; sixth means operably connecting said main engine and said hydraulically operated device for driving said device; and seventh means operably connecting said motor/pump and said hydraulically operated device for driving said device.

13. In combination; first power plant means for providing a main source of power; said first means including a main engine; an auxiliary engine; second means for starting said auxiliary engine; an engine accessory; third means connecting said auxiliary engine to said main engine for starting said main engine; fourth means operably connecting said main engine and said engine accessory for driving said accessory; said second means including a hydraulic motor/pump connected to said auxiliary engine, an accumulator, and valved means for connecting said accumulator to said hydraulic motor/pump; a hydraulically operated device; fifth means operably connecting said main engine and said hydraulically operated device for operating said device; and sixth means operably connecting said motor/pump with said engine accessory and said hydraulically operated device for operating said accessory and device.

14. In combination; first power plant means for providing a main source of power; said first means including a main engine; an auxiliary engine; second means for starting said auxiliary engine; third means for starting said main engine by said auxiliary engine; an engine accessory; fourth means operably connecting said main engine and said engine accessory for driving said accessory; said second means including a hydraulic motor/pump connected to said auxiliary engine, an accumulator, and valved means for connecting said accumulator to said hydraulic motor/pump to direct fluid to said motor/pump; fifth means operably connecting said motor/pump with said engine accessory for driving said accessory; and sixth means operably connecting said motor/pump to said accumulator to charge said accumulator.

15. In combination; first power plant means for providing a main source of power; said first means including a main engine; an auxiliary engine; second means for starting said auxiliary engine; third means connected to said auxiliary engine for starting said main engine; an engine accessory; fourth means operably connecting said main engine and said engine accessory for driving said accessory; said second means including a hydraulic motor/pump connected to said auxiliary engine, an accumulator, and valved means for connecting said accumulator to said hydraulic motor/pump; said engine accessory having a hydraulic motor means operably connected thereto; and fifth means operably connecting said motor/pump with said hydraulic motor means for driving said accessory.

16. In combination, a main engine, a hydraulic starting motor drivingly connected to said main engine, an auxiliary engine, a hydraulic motor/pump drivingly connected to said auxiliary engine, an accumulator, first valved means connecting said accumulator to said hydraulic motor/pump to drive said motor/pump as a motor, a transmission unit, an engine accessory, means connecting said engine accessory to said transmission unit to be driven thereby, first means connecting said main engine to said transmission for driving it, hydraulic motor means, second means connecting said hydraulic motor means to said transmission unit for driving it when said motor/pump is operating as a pump, third means connecting said hydraulic motor/pump to said hydraulic motor means for operating said hydraulic motor means when said hydraulic motor/pump is operating as a pump to drive said transmission unit, and fourth means connecting said motor/pump to said hydraulic starting motor for driving it when said motor/pump is operating as a pump, said fourth means including a valve for directing a fluid to said hydraulic motor.

17. In combination, a main engine, a hydraulic starting motor drivingly connected to said main engine, an auxiliary engine, a hydraulic motor/pump drivingly connected to said auxiliary engine, an accumulator, first valved means connecting said accumulator to said hydraulic motor/pump to drive said motor/pump as a motor, a transmission unit, an engine accessory, means connecting said engine accessory to said transmission unit to be driven thereby, first means connecting said main engine to said transmission for driving it, hydraulic motor means, second means connecting said hydraulic motor means to said transmission unit for driving it when said motor/pump is operating as a pump, third means connecting said hydraulic motor/pump to said hydraulic motor means for operating said hydraulic motor means when said hydraulic motor/pump is operating as a pump to drive said transmission unit, and drive means connecting said motor/pump to said hydraulic starting motor for driving it when said motor/pump is operating as a pump, said drive means having a fluid outlet, said drive means having a valve for controlling the flow of fluid through said outlet to said hydraulic starting motor.

18. In combination; first power plant means for providing a main source of power; said first means including a main engine; an auxiliary engine; second means for starting said auxiliary engine; an engine accessory; third means for starting said main engine driven by said auxiliary engine; fourth means operably connecting said main engine and said engine accessory for driving said accessory; said second means including a hydraulic motor/pump connected to said auxiliary engine, an accumulator, and valved means for connecting said accumulator to said hydraulic motor/pump to drive said motor/pump as a motor; said third means including said hydraulic motor/pump, a hydraulic motor connected to said main engine to start it, and valved means for connecting said motor/pump to said hydraulic motor to drive said hydraulic motor when said motor/pump is operating as a pump; and fourth means operably connecting said motor/pump with said engine accessory for driving said accessory when said motor/pump is operating as a pump; a hydraulically operated device, fifth means operably connecting said motor/pump with said hydraulically operated device for operating it; sixth means operably connecting said main engine with said hydraulically operated device for operating it.

19. In combination; a main engine; an auxiliary engine; first means for starting said main engine and said auxiliary engine; an engine accessory; second means operably connecting said main engine and said engine accessory for driving said accessory; said first means including a hydraulic motor/pump drivingly connected to said auxiliary engine, a first hydraulic motor drivingly connected to said main engine, an accumulator, and first valved fluid conduit means for connecting said accumulator to said hydraulic motor/pump for starting said auxiliary engine; said engine accessory having a second hydraulic motor operably connected thereto; third means operably connecting said motor/pump with said second hydraulic motor for driving said accessory; a hydraulically operated device; fourth means operably connecting said main engine and said hydraulically operated device for driving said device; and fifth means operably connecting said motor/pump to said accumulator for recharging said accumulator; said fifth means including second valved means; said second valved means directing a fluid therethrough to said accumulator to recharge it in one position; said second valved means directing a fluid therethrough from said second hydraulic motor to said hydraulically operated device in another position.

References Cited in the file of this patent

UNITED STATES PATENTS

| | | |
|---|---|---|
| 2,557,933 | Beaman et al. | June 26, 1951 |
| 2,906,088 | Clark | Sept. 29, 1959 |